(12) United States Patent
Tachibana

(10) Patent No.: US 10,890,658 B2
(45) Date of Patent: Jan. 12, 2021

(54) VEHICLE GROUP CONTROL DEVICE

(71) Applicant: TOYOTA JIDOSHA KABUSHIKI KAISHA, Toyota (JP)

(72) Inventor: Akihide Tachibana, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 122 days.

(21) Appl. No.: 16/176,128

(22) Filed: Oct. 31, 2018

(65) Prior Publication Data

US 2019/0162844 A1 May 30, 2019

(30) Foreign Application Priority Data

Nov. 27, 2017 (JP) ................................. 2017-226563

(51) Int. Cl.
| | | |
|---|---|---|
| *G01S 13/931* | (2020.01) | |
| *G05D 1/02* | (2020.01) | |
| *B60W 30/16* | (2020.01) | |
| *G01S 7/00* | (2006.01) | |
| *B60K 31/00* | (2006.01) | |
| *G08G 1/16* | (2006.01) | |

(52) U.S. Cl.
CPC .......... *G01S 13/931* (2013.01); *B60W 30/16* (2013.01); *G01S 7/003* (2013.01); *G05D 1/0291* (2013.01); *B60K 31/0008* (2013.01); *B60K 2031/0025* (2013.01); *B60T 2201/02* (2013.01); *B60W 2420/52* (2013.01); *G01S 2013/9316* (2020.01); *G01S 2013/9325* (2013.01); *G01S 2013/9327* (2020.01); *G05D 1/0217* (2013.01); *G05D 1/0278* (2013.01); *G08G 1/166* (2013.01)

(58) Field of Classification Search
CPC ................... G01S 13/931; G01S 7/003; G01S 2013/9316; G05D 1/0291; B60W 30/16
USPC ......................................................... 342/70
See application file for complete search history.

(56) References Cited

U.S. PATENT DOCUMENTS

| | | | | |
|---|---|---|---|---|
| 2014/0214608 A1* | 7/2014 | Pedley | ............... | G06Q 30/0643 705/26.35 |
| 2017/0264347 A1* | 9/2017 | Le-Ngoc | ............... | H04B 7/0626 |

FOREIGN PATENT DOCUMENTS

| | | |
|---|---|---|
| JP | 2015-022419 A | 2/2015 |
| JP | 2015-064662 A | 4/2015 |

* cited by examiner

*Primary Examiner* — Bo Fan
(74) *Attorney, Agent, or Firm* — Sughrue Mion, PLLC

(57) ABSTRACT

A vehicle group control device includes: a first vehicle-to-vehicle distance estimation unit configured to estimate a first vehicle-to-vehicle distance which is a vehicle-to-vehicle distance between the first vehicle and the second vehicle; a second vehicle-to-vehicle distance recognition unit configured to recognize a second vehicle-to-vehicle distance which is a vehicle-to-vehicle distance between a reference interruption vehicle and the first vehicle; and the number of interruption vehicles estimation unit configured to estimate the number of interruption vehicles between the first vehicle and the second vehicle based on the first vehicle-to-vehicle distance and the second vehicle-to-vehicle distance.

6 Claims, 9 Drawing Sheets

VEHICLE GROUP CONTROL DEVICE

TECHNICAL FIELD

The present disclosure relates to a vehicle group control device.

BACKGROUND

In the related art, Japanese Unexamined Patent Publication No. 2015-22419 is known as a technical literature relating to a vehicle group control device. In this publication, a platooning travel control device is disclosed, which reorganizes the vehicle group by linking the interruption vehicle to the vehicle group if an interruption vehicle interrupts a vehicle group.

CROSS-REFERENCE TO RELATED APPLICATION

This application claims the benefit of priority from Japanese Patent Application No. 2017-226563, filed Nov. 27, 2017, the entire contents of which are incorporated herein by reference.

SUMMARY

Incidentally, in the device in the related art, it is assumed that the interruption vehicle has a function of forming the vehicle group. However, if an interruption vehicle that does not have the function of forming a vehicle group interrupts the vehicle group, it is necessary to control the vehicle group while considering the traveling situation of the interruption vehicle. At this time, since the number of interruption vehicles also affects the vehicle group control, it is required to estimate the number of interruption vehicles that do not form a vehicle group.

Therefore, in this technical field, it is desirable to provide a vehicle group control device that can estimate the number of interruption vehicles that do not form a vehicle group, which are present between a first vehicle and a second vehicle that form the vehicle group.

According to an aspect of the present disclosure, there is provided a vehicle group control device configured to control traveling of a vehicle group, the device including at least a first vehicle and a second vehicle traveling in front of the first vehicle, including: a first vehicle-to-vehicle distance estimation unit configured to estimate a first vehicle-to-vehicle distance which is a vehicle-to-vehicle distance between the first vehicle and the second vehicle; a second vehicle-to-vehicle distance recognition unit configured to recognize a second vehicle-to-vehicle distance which is a vehicle-to-vehicle distance between a reference interruption vehicle and the second vehicle, the leading interruption vehicle being from among the interruption vehicles and traveling immediately behind the second vehicle, based on a result of measurement performed by a vehicle-mounted sensor of the first vehicle, when at least one interruption vehicle not included in the vehicle group is present between the first vehicle and the second vehicle; and a number-of-interruption-vehicles estimation unit configured to estimate the number of interruption vehicles between the first vehicle and the second vehicle based on the first vehicle-to-vehicle distance and the second vehicle-to-vehicle distance.

In the vehicle group control device according to the aspect of the present disclosure, when an interruption vehicle that does not form the vehicle group is present between the first vehicle and the second vehicle, it is possible to estimate the number of interruption vehicles between the first vehicle and the second vehicle based on the first vehicle-to-vehicle distance and the second vehicle-to-vehicle distance by estimating the first vehicle-to-vehicle distance which is the vehicle-to-vehicle distance between the first vehicle and the second vehicle, and by recognizing the second vehicle-to-vehicle distance which is the vehicle-to-vehicle distance between the reference interruption vehicle traveling immediately in front of the first vehicle and the first vehicle from among the interruption vehicles based on the result of measurement performed by the vehicle-mounted sensor of the first vehicle.

The vehicle group control device according to the aspect of the present disclosure may further include a vehicle group release unit configured to release the vehicle group of the first vehicle and the second vehicle when the number of interruption vehicles estimated by the number of interruption vehicles estimation unit is equal to or greater than a vehicle group release threshold value which is greater than 1.

The vehicle group control device according to the aspect of the present disclosure may further include: a reference vehicle speed recognition unit configured to recognize a reference vehicle speed which is a vehicle speed of the reference interruption vehicle based on the result of measurement performed by the vehicle-mounted sensor of the first vehicle, when at least one interruption vehicle that does not form the vehicle group is present between the first vehicle and the second vehicle; a set maximum speed information acquisition unit configured to acquire set maximum speed information relating to a set maximum speed set in advance for a lane in which the first vehicle and the second vehicle are traveling; and a vehicle group control unit configured to control the vehicle speed of the vehicle group based on the reference vehicle speed when the reference vehicle speed is equal to or lower than the set maximum speed. If the reference vehicle speed is equal to or lower than the set maximum speed, when a difference between the reference vehicle speed and the set maximum speed is equal to or smaller than a difference threshold value, the vehicle group release threshold value may be changed to a larger value compared to a case where the difference between the reference vehicle speed and the set maximum speed exceeds the difference threshold value.

According to another aspect of the present disclosure, there is provided a vehicle group control device configured to control traveling of a vehicle group including at least a first vehicle and a second vehicle traveling in front of the first vehicle, the device including: a first vehicle-to-vehicle distance estimation unit configured to estimate a first vehicle-to-vehicle distance which is a vehicle-to-vehicle distance between the first vehicle and the second vehicle; a third vehicle-to-vehicle distance recognition unit configured to recognize a third vehicle-to-vehicle distance which is a vehicle-to-vehicle distance between a leading interruption vehicle and the second vehicle, the leading interruption vehicle being from among the interruption vehicles and traveling immediately behind the second vehicle, based on a result of measurement performed by a vehicle-mounted sensor of the second vehicle, if at least one interruption vehicle not included in the vehicle group is present between the first vehicle and the second vehicle; and the number of interruption vehicles estimation unit configured to estimate the number of interruption vehicles between the first vehicle and the second vehicle based on the first vehicle-to-vehicle distance and the third vehicle-to-vehicle distance.

In the vehicle group control device according to the aspect of the present disclosure, when at least one interruption vehicle not included in the vehicle group is present between the first vehicle and the second vehicle, it is possible to estimate the number of interruption vehicles based on the first vehicle-to-vehicle distance which is the vehicle-to-vehicle distance between the first vehicle and the second vehicle and the third vehicle-to-vehicle distance described above by recognizing the third vehicle-to-vehicle distance which is a vehicle-to-vehicle distance between the leading interruption vehicle traveling immediately behind the second vehicle and the second vehicle from among the interruption vehicles based on the result of measurement performed by the vehicle-mounted sensor of the second vehicle.

The vehicle group control device according to the aspect of the present disclosure may further include a vehicle group release unit configured to release the vehicle group of the first vehicle and the second vehicle when the number of interruption vehicles estimated by the number of interruption vehicles estimation unit is equal to or greater than a vehicle group release threshold value.

The vehicle group control device according to the aspect of the present disclosure may further include: a reference vehicle speed recognition unit configured to recognize a reference vehicle speed which is a vehicle speed of a reference interruption vehicle traveling immediately in front of the first vehicle from among the interruption vehicles based on the result of measurement performed by the vehicle-mounted sensor of the first vehicle, when at least one interruption vehicle not included in the vehicle group is present between the first vehicle and the second vehicle; a set maximum speed information acquisition unit configured to acquire set maximum speed information relating to a set maximum speed set in advance for a lane in which the first vehicle and the second vehicle are traveling; and a vehicle group control unit configured to control the vehicle speed of the vehicle group based on the reference vehicle speed if the reference vehicle speed is equal to or lower than the set maximum speed. If the reference vehicle speed is equal to or lower than the set maximum speed, when a difference between the reference vehicle speed and the set maximum speed is equal to or smaller than a difference threshold value, the vehicle group release threshold value may be changed to a larger value compared to a case where the difference between the reference vehicle speed and the set maximum speed exceeds the difference threshold value.

As described above, according to the vehicle group control device in the aspects of the present disclosure, it is possible to estimate the number of interruption vehicles not included in the vehicle group, which are present between a first vehicle and a second vehicle included in the vehicle group.

DETAILED DESCRIPTION

Hereinafter, embodiments of the present disclosure will be described with reference to the drawings.

First Embodiment

Figure 1:
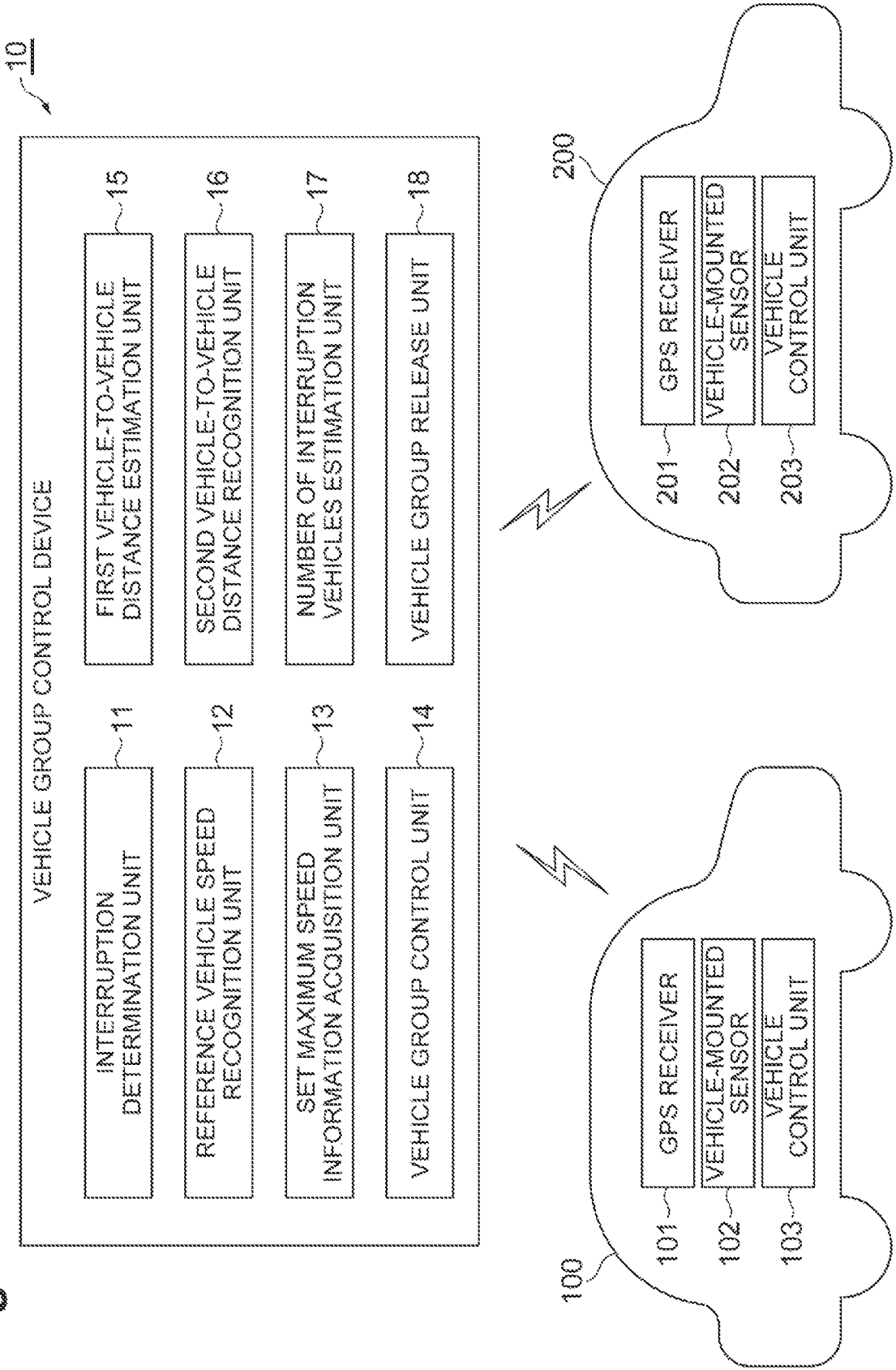
FIG. 1 is a block diagram illustrating a vehicle group control device according to a first embodiment.

A vehicle group control device according to a first embodiment illustrated in FIG. 1 is configured in, for example, a server, and controls a plurality of vehicles as a vehicle group. As illustrated in FIG. 1, a vehicle group control device 10 causes a first vehicle 100 and a second vehicle 200 having a function of forming a vehicle group to travel as one vehicle group via wireless communication. The second vehicle 200 is a vehicle traveling in front of the first vehicle 100.

The first vehicle 100 having the function of forming the vehicle group has a function of communication with the vehicle group control device 10 and a function of vehicle-to-vehicle communication with a vehicle (including the second vehicle 200) forming the same vehicle group.

In addition, a GPS receiver 101, a vehicle-mounted sensor 102, and a vehicle control unit 103 are mounted on the first vehicle 100. The GPS receiver 101 is a measuring unit that measures the position of the first vehicle 100 on the map (for example, the latitude and longitude of the host vehicle) by receiving signals from three or more GPS satellites. The vehicle-mounted sensor 102 includes an external sensor and an internal sensor. The external sensor is, for example, a millimeter wave radar or a light detection and ranging (LIDAR). The external sensor may be a sensor capable of measuring a relative distance and a relative speed to another vehicle in the vicinity, and may be a camera (a monocular camera or a stereo camera). The internal sensor includes at least a vehicle speed sensor that measures a vehicle speed. The internal sensor may include an acceleration sensor or a yaw rate sensor.

The vehicle control unit 103 is configured in an electronic control unit (ECU) of the first vehicle 100, and controls the travel of the first vehicle 100 by controlling an engine actuator, a brake actuator, a steering actuator and the like of the first vehicle 100. As an example, the vehicle control unit 103 controls the vehicle speed of the first vehicle 100 so as to be a target vehicle speed transmitted from the vehicle group control device 10. The second vehicle 200 also has a same configuration as the first vehicle 100. The configuration of the vehicle having the function of forming the vehicle group is not limited to the configuration described above.

Configuration of Vehicle Group Control Device in First Embodiment

Figure 2:
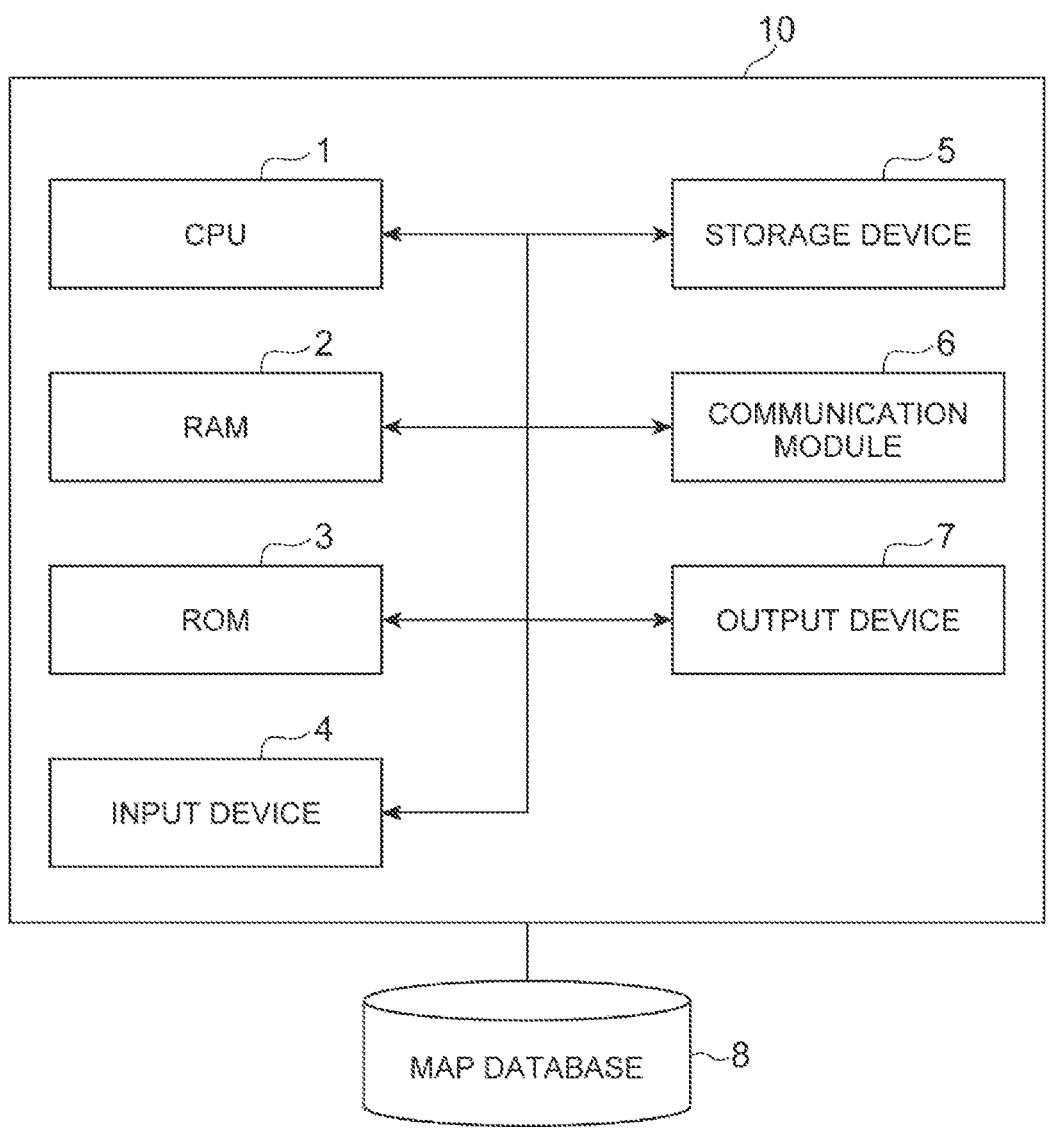
FIG. 2 is a diagram illustrating a hardware configuration of the vehicle group control device.

A configuration of the vehicle group control device 10 in the first embodiment will be described. First, a hardware configuration of the vehicle group control device 10 will be described. FIG. 2 is a diagram illustrating the hardware configuration of the vehicle group control device 10.

As illustrated in FIG. 2, the vehicle group control device 10 can physically be configured to include one or a plurality of central processing units (CPUs) 1, a random access memory (RAM) 2, a read only memory (ROM) 3, input devices 4 such as a keyboard and a mouse which are input devices, a storage device 5 such as a semiconductor memory, a communication module 6 which is a data transmission/reception device such as a network card, an output device 7 such as a display and the like.

The CPU 1 realizes various processing items by loading a program necessary for executing the processing on the RAM 2 from the ROM 3 or the storage device 5, and executing the loaded program. The program and data necessary for the processing may be input via the communication module 6. The vehicle group control device 10 communicates with the first vehicle 100 and the second vehicle 200 using the communication module 6. The vehicle group control device 10 may be configured to include a plurality of computers. In addition, the input device 4 and the output device 7 do not be necessarily included.

The vehicle group control device 10 may be connected to a map database 8. The map database 8 is a database that stores map information. The map information includes information on the position of a road, information on a shape of the road (for example, a curve, a type of a straight section, a curvature of the curve, and the like), information on positions of an intersection and a branch point, and the like.

The map information also includes set maximum speed information relating to a set maximum speed (for example, a legal maximum speed) set in advance in a lane. The set maximum speed is set in association with the information on the position of lane. The set maximum speed is not limited to the legal maximum speed but may be any set speed. The map database 8 may be configured in the storage device 5. The vehicle group control device 10 does not need to be necessarily connected to the map database 8.

Next, a functional configuration of the vehicle group control device 10 will be described with reference to FIG. 1. As illustrated in FIG. 1, the vehicle group control device 10 includes an interruption determination unit 11, a reference vehicle speed recognition unit 12, a set maximum speed information acquisition unit 13, a vehicle group control unit 14, a first vehicle-to-vehicle distance estimation unit 15, a second vehicle-to-vehicle distance recognition unit 16, number of interruption vehicles estimation unit 17, and a vehicle group release unit 18.

The interruption determination unit 11 determines whether or not an interruption vehicle not included in the vehicle group is present between the first vehicle 100 and the second vehicle 200. As an example, the interruption determination unit 11 performs the determination described above based on the result of measurement performed by the vehicle-mounted sensor 102 of the first vehicle 100 (for example, the result of measurement performed by the millimeter wave radar). At this stage, the number of interruption vehicles is unknown. The determination of the presence or absence of the interruption vehicle is not limited to the method described above, and various well-known methods can be adopted.

If it is determined by the interruption determination unit 11 that an interruption vehicle is present, the reference vehicle speed recognition unit 12 recognizes a vehicle speed of a reference interruption vehicle which is an interruption vehicle that travels immediately in front of the first vehicle 100. The vehicle speed of the reference interruption vehicle is assumed to be a reference vehicle speed. As an example, the reference vehicle speed recognition unit 12 recognizes the reference vehicle speed based on the result of measurement performed by the vehicle-mounted sensor 102 of the first vehicle 100 (for example, the relative speed of the reference interruption vehicle measured by the millimeter wave radar) and the vehicle speed of the first vehicle 100.

The set maximum speed information acquisition unit 13 acquires the set maximum speed information on the lane in which the first vehicle 100 and the second vehicle 200 are traveling. As an example, the set maximum speed information acquisition unit 13 acquires the set maximum speed information on the lane based on the position of the first vehicle 100 on the map measured by the GPS receiver 101 and the map information in the map database 8. Here, it is assumed that the second vehicle 200 is also traveling on the lane in which the first vehicle 100 is traveling. The set maximum speed information acquisition unit 13 recognizes the set maximum speed in the lane in which the first vehicle 100 and the second vehicle 200 are traveling based on the set maximum speed information.

If the first vehicle 100 and the second vehicle 200 are traveling in sections in which the set maximum speeds are different from each other, the set maximum speed information acquisition unit 13 may recognize the lower set maximum speed among the set maximum speed information on each of the sections of the first vehicle 100 and the second vehicle 200 as the set maximum speed in the lane in which the first vehicle 100 and the second vehicle 200 are traveling.

The vehicle group control unit 14 performs a vehicle group control to cause the first vehicle 100 and the second vehicle 200 to travel as one vehicle group. The vehicle group control unit 14 calculates a target vehicle speed of the vehicle group based on the reference vehicle speed recognized by the reference vehicle speed recognition unit 12 and the set maximum speed information acquired by the set maximum speed information acquisition unit 13 (the set maximum speed information on the lane in which the first vehicle 100 and the second vehicle 200 travel). Specifically, if the reference vehicle speed is lower than the set maximum speed, the vehicle group control unit 14 calculates the target vehicle speed of the vehicle group based on the reference vehicle speed. As an example, the vehicle group control unit 14 calculates the reference vehicle speed as the target vehicle speed of the vehicle group. If the reference vehicle speed exceeds the set maximum speed, the vehicle group control unit 14 calculates the set maximum speed as the target vehicle speed of the vehicle group.

The vehicle group control unit 14 controls the vehicle speed of the vehicle group by transmitting the target vehicle speed of the vehicle group to the first vehicle 100 and the second vehicle 200. The first vehicle 100 and the second vehicle 200 adjust the vehicle speed such that the vehicle speeds becomes the target vehicle speed of the vehicle group.

If it is determined by the interruption determination unit 11 that an interruption vehicle is present, the first vehicle-to-vehicle distance estimation unit 15 estimates a first vehicle-to-vehicle distance which is a vehicle-to-vehicle distance between the first vehicle 100 and the second vehicle 200.

Figure 3:
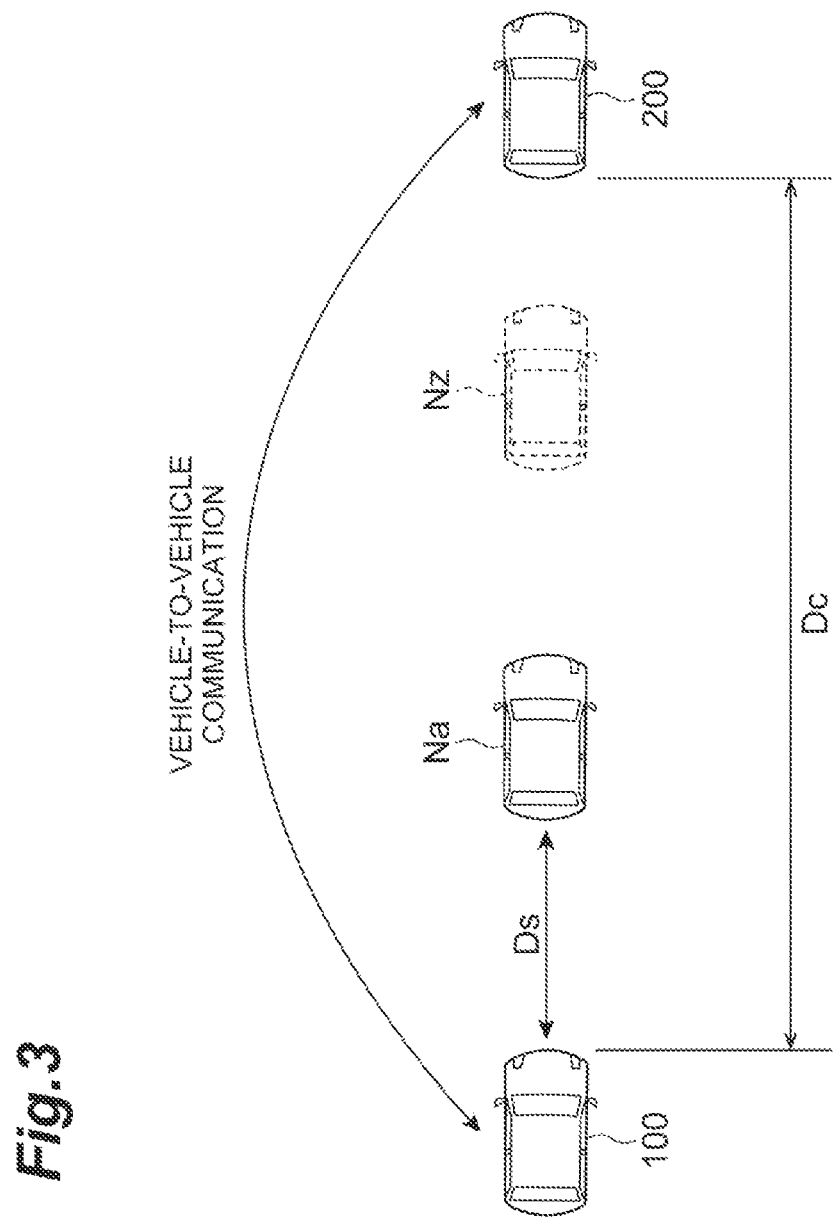
FIG. 3 is a plan view illustrating a situation in which interruption vehicles not included in a vehicle group are present between a first vehicle and a second vehicle.

Here, FIG. 3 is a plan view illustrating a situation in which interruption vehicles not included in a vehicle group are present between the first vehicle 100 and the second vehicle 200. FIG. 3 illustrates a reference interruption vehicle Na traveling immediately in front of the first vehicle 100. A reference vehicle Nz indicates an interruption vehicle (the presence or absence of the interruption vehicle is not clearly known) traveling in front of the reference interruption vehicle. In addition, the first vehicle-to-vehicle distance which is the vehicle-to-vehicle distance between the first vehicle 100 and the second vehicle 200 is indicated as Dc, and a second vehicle-to-vehicle distance which is the vehicle-to-vehicle distance between the first vehicle 100 and the reference interruption vehicle Na is indicated as Ds. In FIG. 3, the first vehicle 100 and the second vehicle 200 forming the vehicle group are performing vehicle-to-vehicle communication.

In this case, the first vehicle-to-vehicle distance estimation unit 15 performs the estimation of the first vehicle-to-vehicle distance Dc using Equation (1) described below. In Equation (1) described below, $D_0$ is a reference vehicle-to-vehicle distance which is the vehicle-to-vehicle distance between the first vehicle 100 and the second vehicle 200 measured immediately before the determination of the presence of the interruption vehicle, $L_1$ is a travel distance of the first vehicle 100 after the determination of the presence of the interruption vehicle, and $L_2$ is the travel distance of the first vehicle 100 after the determination of the presence of the interruption vehicle.

$$Dc=D_0+(L_2-L_1) \quad (1)$$

The first vehicle-to-vehicle distance estimation unit 15 can calculate the reference vehicle-to-vehicle distance $D_0$ from the result of measurement (result of measurement performed by the external sensor) performed by the vehicle-mounted sensor 102 of the first vehicle 100 immediately before the determination of the presence of the interruption vehicle. If the vehicle-mounted sensor 202 of the second vehicle 200 has the function of detecting a following vehicle, the result of measurement performed by the vehicle-mounted sensor 202 may be used.

The first vehicle-to-vehicle distance estimation unit 15 can calculate the travel distance $L_1$ by performing a time integration of the vehicle speed of the first vehicle 100 after the determination of the presence of the interruption vehicle. The first vehicle-to-vehicle distance estimation unit 15 can calculate the travel distance $L_2$ by performing a time integration of the vehicle speed of the second vehicle 200 after the determination of the presence of the interruption vehicle.

In addition, if an elapsed time after the determination of the presence of the interruption vehicle is equal to or longer than a time threshold value, the first vehicle-to-vehicle distance estimation unit 15 changes the method of estimating the first vehicle-to-vehicle distance Dc to a method in which the GPS is used. The time threshold value is a threshold value set in advance. In this case, the first vehicle-to-vehicle distance estimation unit 15 estimates the first vehicle-to-vehicle distance Dc based on the position of the first vehicle 100 on the map measured by the GPS receiver 101 of the first vehicle 100 and the position of the second vehicle 200 on the map measured by the GPS receiver 201 of the second vehicle 200.

There is a possibility that errors may be accumulated in the calculation of the travel distances $L_1$ and $L_2$ using the integration of the vehicle speeds, but since the error factors affecting the result of measurement performed by the GPS is considered to be the same in the first vehicle 100 and the second vehicle 200 traveling on the short distance, a certain degree of accuracy can be expected for the first vehicle-to-vehicle distance Dc (the relative vehicle between the first vehicle 100 and the second vehicle 200) obtained from the result of measurement performed by the GPS. Therefore, in the first vehicle-to-vehicle distance estimation unit 15, it is possible to suppress the deterioration of the estimation accuracy of the first vehicle-to-vehicle distance Dc by changing the method of estimation using the elapsed time from the method of estimating the first vehicle-to-vehicle distance Dc using the integration of the vehicle speed to the method of estimating the first vehicle-to-vehicle distance Dc using the result of measurement performed by the GPS. The method of estimating the first vehicle-to-vehicle distance Dc by the first vehicle-to-vehicle distance estimation unit 15 is not limited to the methods described above, and various well-known methods can be adopted.

The second vehicle-to-vehicle distance recognition unit 16 estimates the second vehicle-to-vehicle distance Ds which is a vehicle-to-vehicle distance between the first vehicle 100 and the reference interruption vehicle Na traveling immediately in front of the first vehicle 100. The second vehicle-to-vehicle distance recognition unit 16 estimates the second vehicle-to-vehicle distance Ds based on the result of measurement performed by the vehicle-mounted sensor 102 of the first vehicle 100 (result of measurement performed by the external sensor).

The number of interruption vehicles estimation unit 17 estimates the number of interruption vehicles between the first vehicle 100 and the second vehicle 200. The number of interruption vehicles estimation unit 17 estimates the number of interruption vehicles based on the first vehicle-to-vehicle distance Dc estimated by the first vehicle-to-vehicle distance estimation unit 15 and the second vehicle-to-vehicle distance Ds recognized by the second vehicle-to-vehicle distance recognition unit 16.

As an example, since it is considered that the vehicle-to-vehicle distance may have approximately the same interval if a plurality of interruption vehicles are present, the number of interruption vehicles estimation unit 17 assumes a length of the reference interruption vehicle Na as a reference interruption vehicle length K set in advance, and then, estimates the number of interruption vehicles using the length of the margin space between the first vehicle 100 and the second vehicle 200. The reference interruption vehicle length K may be a constant value or may be a changeable value.

Specifically, the number of interruption vehicles estimation unit 17 determines whether the number of interruption vehicles is one or not using Equation (2) below. In the Equation (2) below, $Lt_1$ is a first determination threshold value set in advance.

$$Lt_1 \geq |(Dc-K)/2-Ds| \quad (2)$$

If the Equation (2) described above is satisfied, the number of interruption vehicles estimation unit 17 determines (estimates) that the number of interruption vehicles is one. The fact that the number of interruption vehicles is one means that only the reference interruption vehicle Na is present between the first vehicle 100 and the second vehicle 200.

If the Equation (2) described above is not satisfied, the number of interruption vehicles estimation unit 17 determines whether the number of interruption vehicles is 2 or equal to or greater than 3 using Equation (3) below. $Lt_2$ is a second determination threshold value set in advance. $Lt_2$ is set to a value larger than the first determination threshold value $Lt_1$ in order to prevent a determination chattering.

$$Lt_2 |(Dc-K)/2-Ds| \quad (3)$$

If the Equation (3) described above is satisfied, the number of interruption vehicles estimation unit 17 determines that the number of interruption vehicles is two. If the Equation (3) described above is not satisfied, the number of interruption vehicles estimation unit 17 determines that the number of interruption vehicles is equal to or greater than three.

If the Equation (3) described above is not satisfied, the number of interruption vehicles estimation unit 17 may determine whether the number of interruption vehicles is three or equal to or greater than four using an Equation in which the second determination threshold value $Lt_2$ in the Equation (3) described above is replaced by a third determination threshold value $Lt_3$ which is larger than the second determination threshold value $Lt_2$. Similarly, the number of interruption vehicles estimation unit 17 can estimate the number of interruption vehicles of five or more vehicles. In addition, the number of interruption vehicles estimation unit 17 may estimate the number of interruption vehicles from the first vehicle-to-vehicle distance Dc and the second vehicle-to-vehicle distance Ds using map data in which the first vehicle-to-vehicle distance Dc and the second vehicle-to-vehicle distance Ds are associated in advance with the result estimation of the number of interruption vehicles.

The vehicle group release unit 18 performs the determination on releasing the vehicle group of the first vehicle 100 and the second vehicle 200 based on the number of interruption vehicles estimated by the number of interruption vehicles estimation unit 17. If the number of interruption vehicles is equal to or greater than a vehicle group release threshold value, the vehicle group release unit 18 releases the vehicle group of the first vehicle 100 and the second vehicle 200. The vehicle group release threshold value is a value greater than one set in advance.

The vehicle group release unit 18 can change the vehicle group release threshold value to a larger value based on the reference vehicle speed recognized by the reference vehicle speed recognition unit 12 and the set maximum speed acquired by the set maximum speed information acquisition unit 13 (the set maximum speed information on the lane in which the first vehicle 100 and the second vehicle 200 travel).

If the reference vehicle speed is equal to or lower than the set maximum speed, and when the difference between the reference vehicle speed and the set maximum speed is equal to or smaller than a difference threshold value, the vehicle group release unit 18 changes the vehicle group release threshold value to a larger value compared to a case where the difference between the reference vehicle speed and the set maximum speed exceeds the difference threshold value. The difference threshold value is a threshold value set in advance. The difference threshold value may be a constant value or may be a changeable value. For example, the vehicle group release unit 18 changes the vehicle group release threshold value from 2 to 3. The vehicle group release threshold value may be a constant value which is not changed.

The vehicle group release unit 18 may perform the determination on release of the vehicle group of the first vehicle 100 and the second vehicle 200 based on an azimuth angle relationship between the first vehicle 100 and the second vehicle 200. As an example, the vehicle group release unit 18 determines whether the second vehicle 200 is positioned within a range of an azimuth angle of a predetermined angle to the left and right from a center line extending in front of the first vehicle 100 with the first vehicle 100 as a reference based on the position of the first vehicle 100 on the map measured by the GPS receiver 101 and the position of the second vehicle 200 on the map measured by the GPS receiver 201.

If it is determined that the second vehicle 200 is not positioned within the range of an azimuth angle with the first vehicle 100 as the reference, since the second vehicle 200 may be in an inappropriate state as a preceding vehicle of the vehicle group due to a lane change or the like, the vehicle group release unit 18 releases the vehicle group of the first vehicle 100 and the second vehicle 200. Even if it is determined by the interruption determination unit 11 that the interruption vehicle is present, when it is determined that the second vehicle 200 is not positioned within the range of the azimuth angle with the first vehicle 100 as the reference, the vehicle group release unit 18 may release the vehicle group without estimating the number of interruption vehicles.

Vehicle Group Release Processing in First Embodiment

Figure 4:
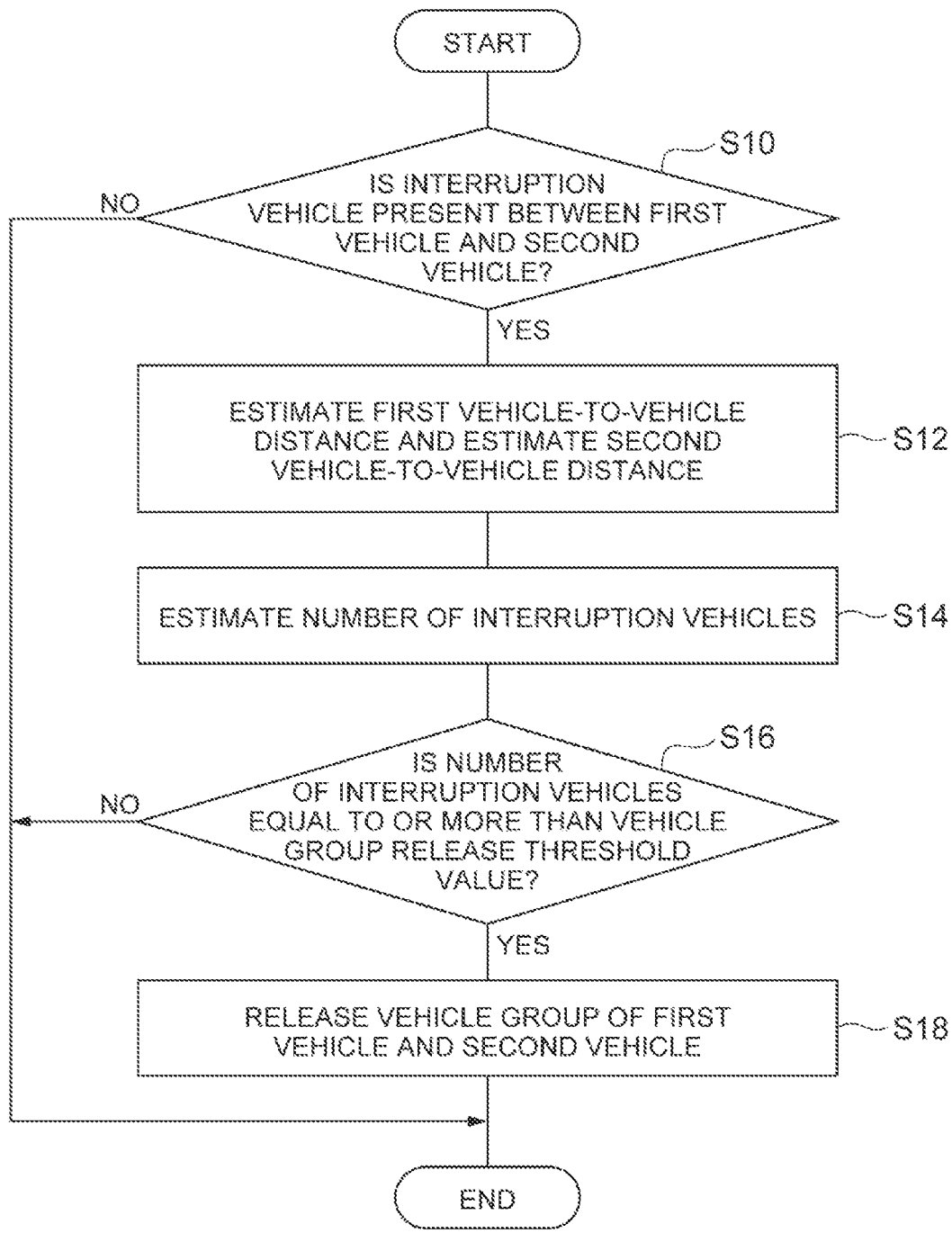
FIG. 4 is a flowchart illustrating vehicle group release processing performed by the vehicle group control device.

Next, vehicle group release processing by the vehicle group control device 10 in the first embodiment will be described. FIG. 4 is a flowchart illustrating the vehicle group release processing by the vehicle group control device 10. The processing in the flowchart illustrated in FIG. 4 is executed when the first vehicle 100 and the second vehicle 200 are traveling as one vehicle group.

As illustrated in FIG. 4, in the vehicle group control device 10, as S10, the interruption determination unit 11 determines whether or not an interruption vehicle not included in the vehicle group is present between the first vehicle 100 and the second vehicle 200. As an example, the interruption determination unit 11 performs the determination described above based on the result of measurement performed by the vehicle-mounted sensor 102 of the first vehicle 100 (for example, the result of measurement performed by the millimeter wave radar). If it is determined that the interruption vehicle is not present (NO in S10), the vehicle group control device 10 ends the current processing. Thereafter, the vehicle group control device 10 performs the determination in S10 again after a constant time elapses. If it is determined that the interruption vehicle is present (YES in S10), the vehicle group control device 10 makes the process proceed to S12.

In S12, in the vehicle group control device 10, the first vehicle-to-vehicle distance estimation unit 15 estimates the first vehicle-to-vehicle distance Dc and the second vehicle-to-vehicle distance recognition unit 16 estimates the second vehicle-to-vehicle distance Ds. As an example, the first vehicle-to-vehicle distance estimation unit 15 estimates the first vehicle-to-vehicle distance Dc which is the vehicle-to-vehicle distance between the first vehicle 100 and the second vehicle 200 based on the reference vehicle-to-vehicle distance $D_0$ between the first vehicle 100 and the second vehicle 200 detected immediately before the determination of the presence of the interruption vehicle, the travel distance $L_1$ of the first vehicle 100 after the determination of the presence of the interruption vehicle, and the travel distance $L_2$ of the first vehicle 100 after the determination of the presence of the interruption vehicle. As an example, the second vehicle-to-vehicle distance recognition unit 16 estimates the second vehicle-to-vehicle distance Ds based on the result of measurement performed by the vehicle-mounted sensor 102 (result of measurement performed by the external sensor) of the first vehicle 100.

In the vehicle group control device 10, as S14, the number of interruption vehicles estimation unit 17 estimates the number of interruption vehicles. The number of interruption vehicles estimation unit 17 estimates the number of interruption vehicles based on the first vehicle-to-vehicle distance Dc estimated by the first vehicle-to-vehicle distance estimation unit 15 and the second vehicle-to-vehicle distance Ds recognized by the second vehicle-to-vehicle distance recognition unit 16.

In the vehicle group control device 10, as S16, the vehicle group release unit 18 determines whether or not the number of interruption vehicles is equal to or greater than the vehicle group release threshold value. If it is determined that the number of interruption vehicles is not equal to or greater than the vehicle group release threshold value (NO in S16), the vehicle group control device 10 ends the current processing. Thereafter, the vehicle group control device 10 performs the determination in 810 again after a constant time elapses. If it is determined that the number of interruption vehicles is equal to or greater than the vehicle group release threshold value (YES in S16), the vehicle group control device 10 makes the process proceed to S18.

In the vehicle group control device 10, as S18, the vehicle group release unit 18 releases the vehicle group of the first vehicle 100 and the second vehicle 200.

Vehicle Group Release Threshold Value Changing Processing

Figure 5:
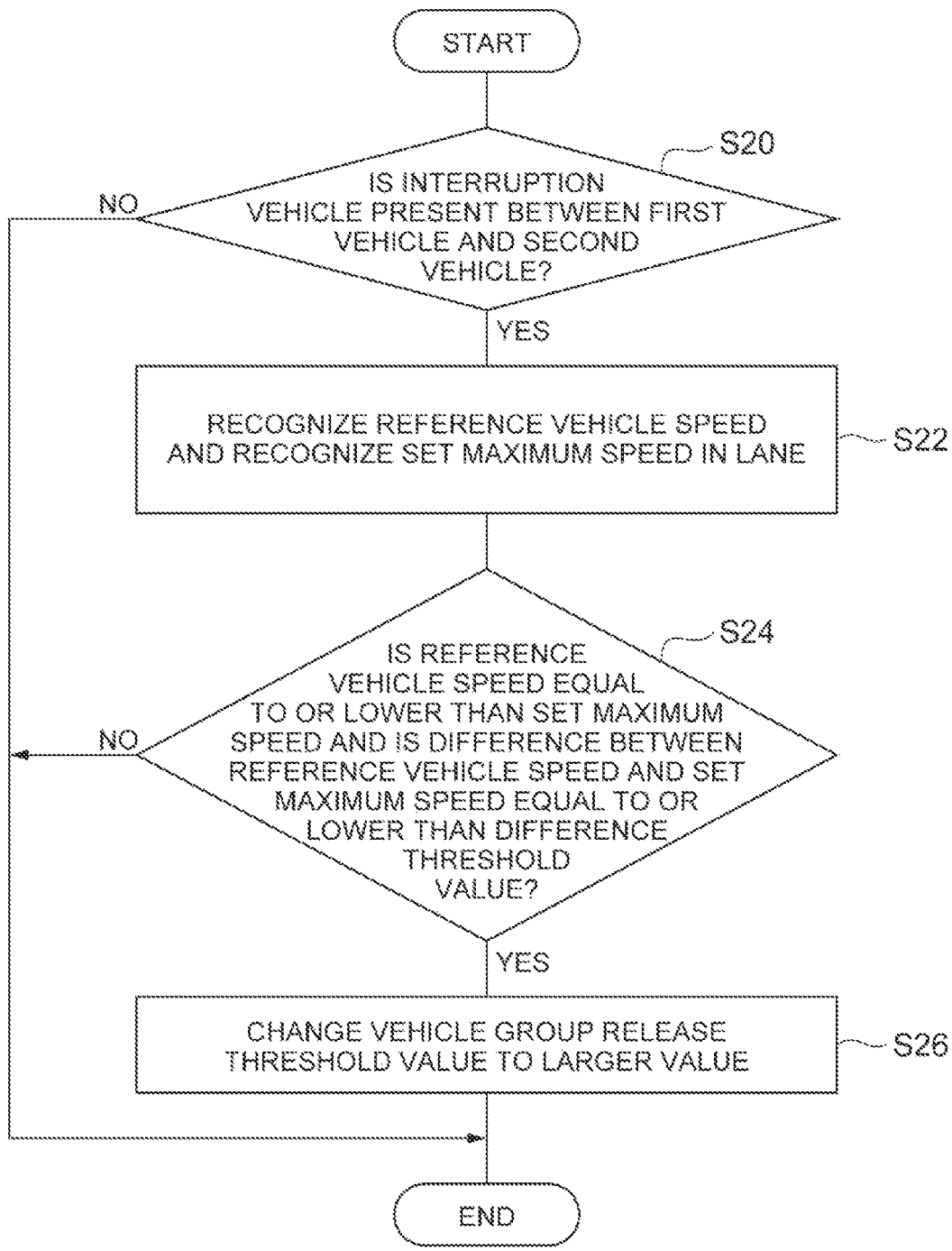
FIG. 5 is a flowchart illustrating vehicle group release threshold value changing processing.

Subsequently, vehicle group release threshold value changing processing in the vehicle group control device 10 will be described. FIG. 5 is a flowchart illustrating the vehicle group release threshold value changing processing. The process of the flowchart illustrated in FIG. 5 is executed when the first vehicle 100 and the second vehicle 200 are traveling as one vehicle group.

As illustrated in FIG. 5, in the vehicle group control device 10, as S20, the interruption determination unit 11 determines whether or not an interruption vehicle not included in the vehicle group is present between the first vehicle 100 and the second vehicle 200. If it is determined that the interruption vehicle is not present (NO in S20), the vehicle group control device 10 ends the current processing. Thereafter, the vehicle group control device 10 performs the determination in S20 again after a predetermined time elapses. If it is determined that the interruption vehicle is present (YES in S20), the vehicle group control device 10 makes the process proceed to S22.

In the vehicle group control device 10, as S22, the reference vehicle speed recognition unit 12 recognizes the reference vehicle speed and the set maximum speed information acquisition unit 13 recognizes the set maximum speed. As an example, the reference vehicle speed recognition unit 12 recognizes the reference vehicle speed based on the result of measurement performed by the vehicle-mounted sensor 102 of the first vehicle 100 (for example, the relative speed of the reference interruption vehicle measured by the millimeter wave radar) and the vehicle speed of the first vehicle 100. As an example, the set maximum speed information acquisition unit 13 recognizes the set maximum speed in the lane in which the first vehicle 100 and the second vehicle 200 are traveling based on the position of the first vehicle 100 on the map measured by the GPS receiver 101 and the map information in the map database 8.

In the vehicle group control device 10, as S24, the vehicle group release unit 18 determines whether or not the reference vehicle speed is equal to or lower than the set maximum speed and the difference between the reference vehicle speed and the set maximum speed is equal to or smaller than the difference threshold value. If it is determined that the reference vehicle speed is not equal to or lower than the set maximum speed and the difference between the reference vehicle speed and the set maximum speed is not equal to or smaller than the difference threshold value (NO in S24), the vehicle group control device 10 ends the current processing.

Thereafter, the vehicle group control device 10 performs the determination in S20 again after a predetermined time elapses. If it is determined that the reference vehicle speed is equal to or lower than the set maximum speed and the difference between the reference vehicle speed and the set maximum speed is equal to or smaller than the difference threshold value (YES in S24), the vehicle group control device 10 makes the processing proceed to S26.

In the vehicle group control device 10, as S26, the vehicle group release unit 18 changes the vehicle group release threshold value to a larger value. For example, the vehicle group control device 10 changes the vehicle group release threshold value to a value equal to or greater than 3 set in advance from 2.

Thereafter, the vehicle group control device 10 performs the determination in S20 again after a predetermined time elapses. After changing the vehicle group release threshold value to a large value, if it is determined as NO in S20 or S24, the vehicle group control device 10 may return the vehicle group release threshold value to the initial value.

First Vehicle-to-vehicle Distance Estimation Method Changing Processing

Figure 6:
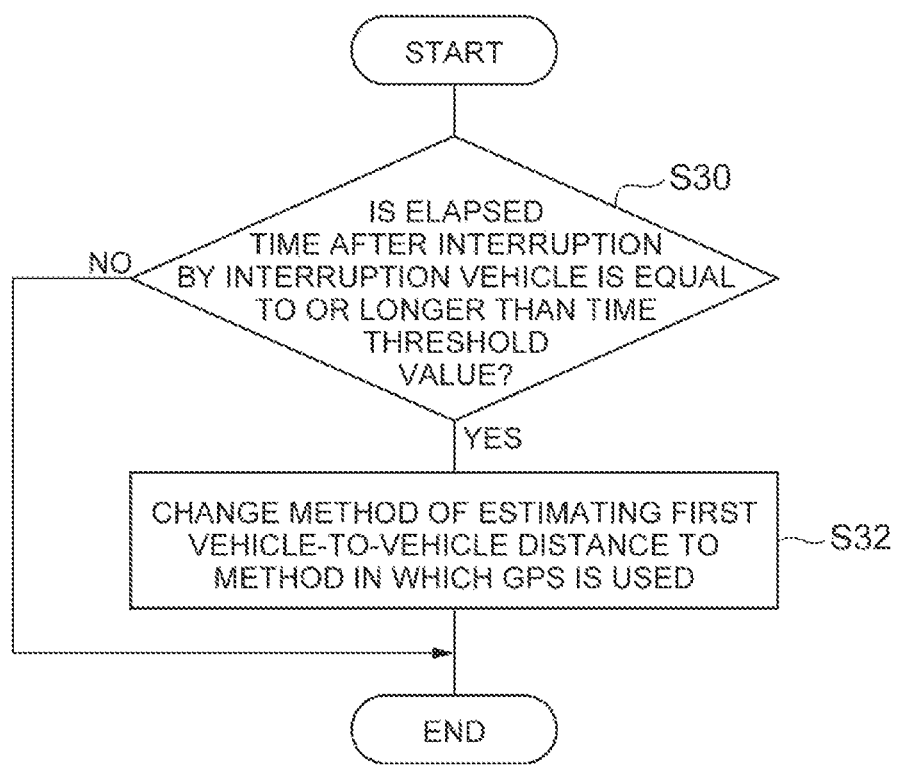
FIG. 6 is a flowchart illustrating first vehicle-to-vehicle distance estimation method changing processing.

Hereinafter, first vehicle-to-vehicle distance estimation method changing processing in the vehicle group control device 10 will be described below. FIG. 6 is a flowchart illustrating the first vehicle-to-vehicle distance estimation method changing processing. The processing in the flowchart illustrated in FIG. 6 is executed when the interruption determination unit 11 determines that the interruption vehicle is present.

As illustrated in FIG. 6, in the vehicle group control device 10, as S30, the first vehicle-to-vehicle distance estimation unit 15 determines whether or not the elapsed time after the determination of the presence of the interruption vehicle is equal to or longer than the time threshold value. If it is not determined the elapsed time is equal to or longer than the time threshold value (NO in S30), the vehicle group control device 10 ends the current processing. Thereafter, if the vehicle group is not released or if it is not determined that interruption vehicle is not present, the vehicle group control device 10 performs the determination in S30 again after a predetermined time elapses. If it is determined the elapsed time is equal to or longer than the time threshold value (YES in S30), the vehicle group control device 10 makes the process proceed to S32.

In vehicle group control device 10, as S32, the first vehicle-to-vehicle distance estimation unit 15 changes the method of estimating the first vehicle-to-vehicle distance Dc to the method in which the GPS is used. In this case, the first vehicle-to-vehicle distance estimation unit 15 estimates the first vehicle-to-vehicle distance Dc based on the position of the first vehicle 100 on the map measured by the GPS receiver 101 of the first vehicle 100 and the position of the second vehicle 200 on the map measured by the GPS receiver 201 of the second vehicle 200.

In the vehicle group control device 10 in the first embodiment described above, if an interruption vehicle not included in the vehicle group is present between the first vehicle 100 and the second vehicle 200, it is possible to estimate the number of interruption vehicles between the first vehicle 100 and the second vehicle 200 based on the first vehicle-to-vehicle distance Dc and the second vehicle-to-vehicle distance Ds by estimating the first vehicle-to-vehicle distance Dc, which is the vehicle-to-vehicle distance between the first vehicle 100 and the second vehicle 200, and by recognizing the second vehicle-to-vehicle distance Ds which is the vehicle-to-vehicle distance between the first vehicle 100 and the reference interruption vehicle Na based on the result of measurement performed by the vehicle-mounted sensor 102 of the first vehicle 100.

In addition, in the vehicle group control device 10, if the number of interruption vehicles not included in the vehicle group is equal to or greater than the vehicle group release threshold value which is greater than 1, by releasing the vehicle group between the first vehicle 100 and the second vehicle 200, it is possible to suppress the occurrence of such a situation as delaying the traveling of the interruption vehicle due the vehicle group control.

Furthermore, in the vehicle group control device 10, even if a plurality of interruption vehicles not included in the vehicle group, if the reference vehicle speed of reference interruption vehicle Na is equal to or lower than the set maximum speed and if the difference between the reference vehicle speed and the set maximum speed is equal to or smaller than the difference threshold value, since the vehicle speed (target vehicle speed) of the first vehicle 100 and the second vehicle 200 forming the vehicle group is close to the set maximum speed in the lane, and thus, it is considered that it is unlikely that the situation of delaying the traveling of the interruption vehicle other than the reference interruption vehicle Na occurs due to the vehicle group control. Therefore, the vehicle group release threshold value is changed to a larger value. Therefore, according to the vehicle group control device 10, if it is unlikely that the situation of delaying the traveling of the interruption vehicle occurs, it is possible to continue the vehicle group control by changing the vehicle group release threshold value to a larger value even if a plurality of interruption vehicles not included in a vehicle group are present.

Second Embodiment

Figure 7:
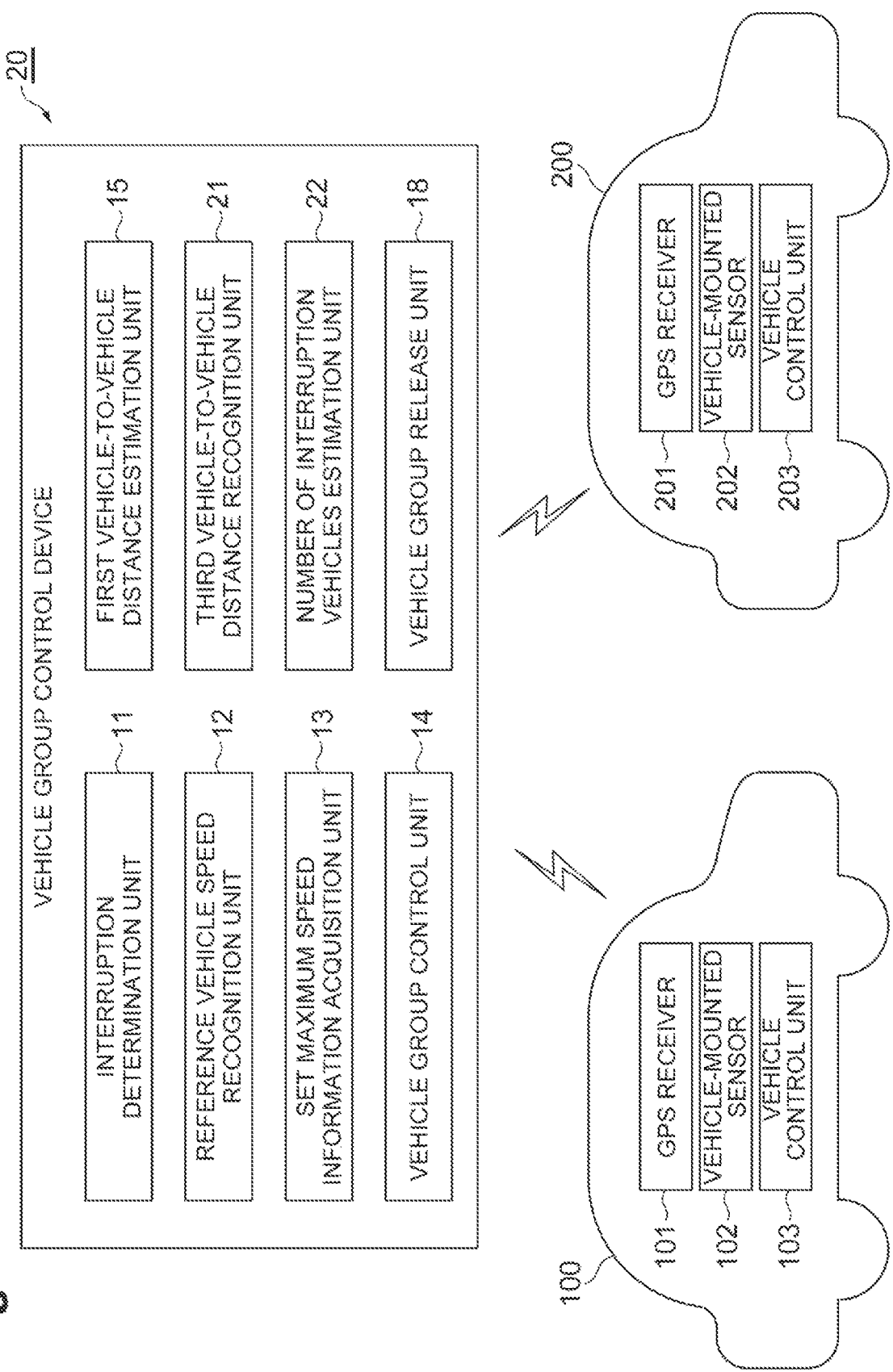
FIG. 7 is a block diagram illustrating a vehicle group control device according to a second embodiment.

Next, a vehicle group control device according to a second embodiment will be described with reference to the drawings. FIG. 7 is a block diagram illustrating the vehicle group control device according to the second embodiment. A vehicle group control device 20 illustrated in FIG. 7 is different from the vehicle group control device in the first embodiment in a point that a third vehicle-to-vehicle distance which is a vehicle-to-vehicle distance between a leading interruption vehicle positioning behind the second vehicle 200 and the second vehicle 200 is used instead of the second vehicle-to-vehicle distance Ds between the first vehicle 100 and the reference interruption vehicle Na. The same reference numerals are given to the same or corresponding configuration elements in the first embodiment, and the descriptions thereof will be omitted.

Configuration of Vehicle Group Control Device in Second Embodiment

As illustrated in FIG. 7, the vehicle group control device 20 is different from the vehicle group control device in the first embodiment in the points that a third vehicle-to-vehicle distance recognition unit 21 is included and the function of the number of interruption vehicles estimation unit 22 is different. The third vehicle-to-vehicle distance recognition unit 21 recognizes the third vehicle-to-vehicle distance which is a vehicle-to-vehicle distance between the leading interruption vehicle positioned behind the second vehicle 200 and the second vehicle 200 based on the result of measurement performed by the vehicle-mounted sensor 202 of the second vehicle 200.

The external sensor of the vehicle-mounted sensor 202 in the second vehicle 200 includes a millimeter wave radar or a LIDAR having a detection range extending behind the second vehicle 200. The external sensor may include a camera (monocular camera or a stereo camera capable of measuring the distance) having an imaging range extending behind the second vehicle 200 instead of the millimeter wave radar or the LIDAR.

Figure 8:
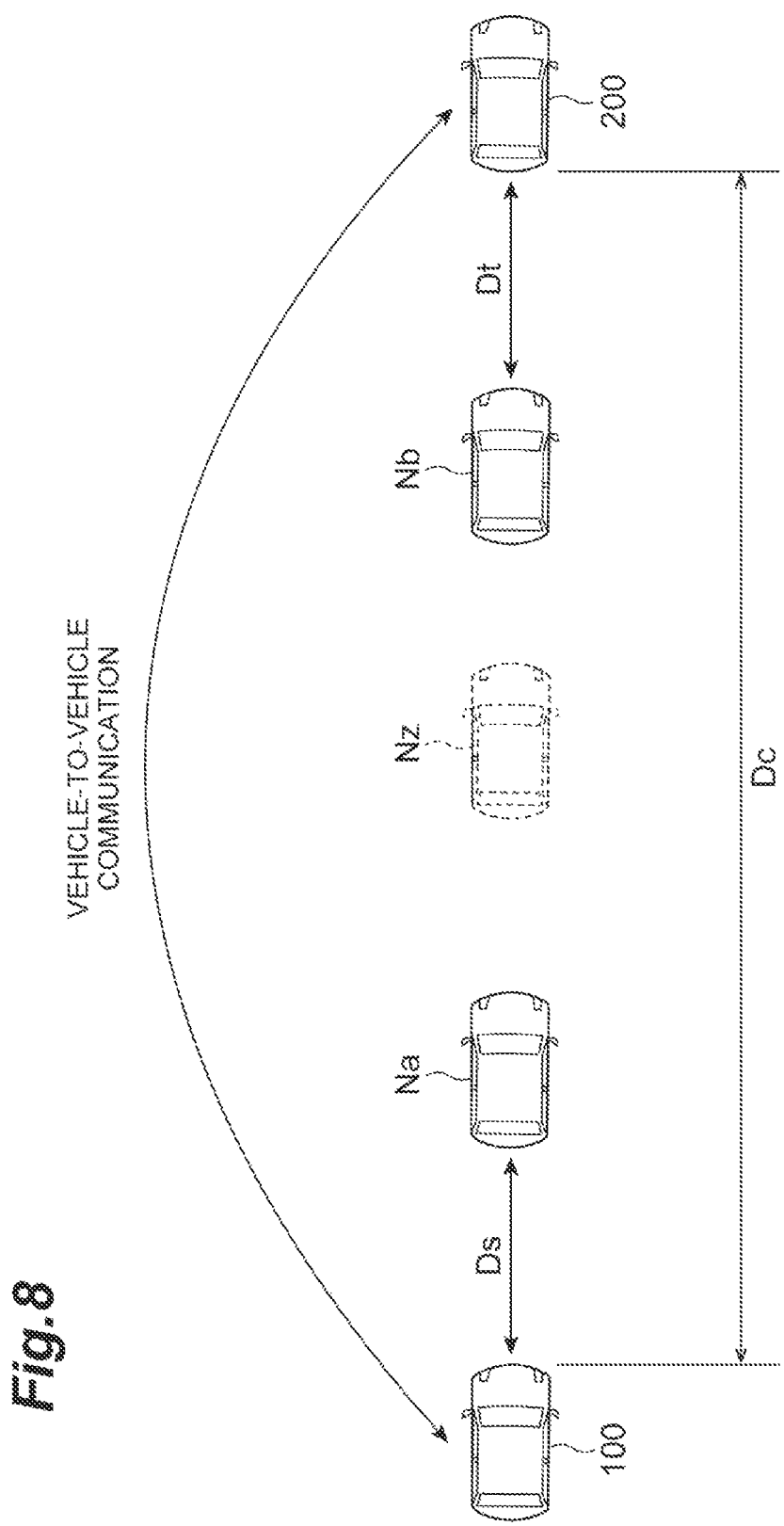
FIG. 8 is a plan view illustrating a situation in which interruption vehicles not included in a vehicle group are present between a first vehicle and a second vehicle.

Here, FIG. 8 is a plan view illustrating a situation in which interruption vehicles not included in vehicle group are present between a first vehicle and a second vehicle. In FIG. 8, a leading interruption vehicle traveling immediately behind the second vehicle 200 from among the interruption vehicles is illustrated as Nb. The third vehicle-to-vehicle distance between the second vehicle 200 and the leading interruption vehicle Nb is Dt. In the situation illustrated in FIG. 8, the third vehicle-to-vehicle distance recognition unit 21 recognizes the third vehicle-to-vehicle distance Dt based on the result of measurement performed by the vehicle-mounted sensor 202 of the second vehicle 200. In the second embodiment, the second vehicle-to-vehicle distance Ds is not used.

The number of interruption vehicles estimation unit 22 estimates the number of interruption vehicles between the first vehicle 100 and the second vehicle 200 based on the first vehicle-to-vehicle distance Dc between the first vehicle 100 and the second vehicle 200 estimated by the first vehicle-to-vehicle distance estimation unit 15 and the third vehicle-to-vehicle distance Dt between the second vehicle 200 and the leading interruption vehicle Nb recognized by the third vehicle-to-vehicle distance recognition unit 21.

As an example, since it is considered that the vehicle-to-vehicle distance may have approximately the same interval if a plurality of interruption vehicles are present, the number of interruption vehicles estimation unit 22 assumes a length of the leading interruption vehicle Nb as a leading interruption vehicle length Kp set in advance, and then, and estimates the number of interruption vehicles using the length of the margin space between the first vehicle 100 and the second vehicle 200. The leading interruption vehicle length Kp may be a constant value or may be a changeable value.

Specifically, the number of interruption vehicles estimation unit 22 can determine whether the number of interruption vehicles is one or not by replacing the second vehicle-to-vehicle distance Ds in Equation (2) in the first embodiment with the third vehicle-to-vehicle distance Dt. Similarly, the number of interruption vehicles estimation unit 22 can determine whether the number of interruption vehicles is two or not by replacing the second vehicle-to-vehicle distance Ds in Equation (3) in the first embodiment with the third vehicle-to-vehicle distance Dt. Similar is the case of the number of interruption vehicles equal to or greater than 3.

Figure 9:
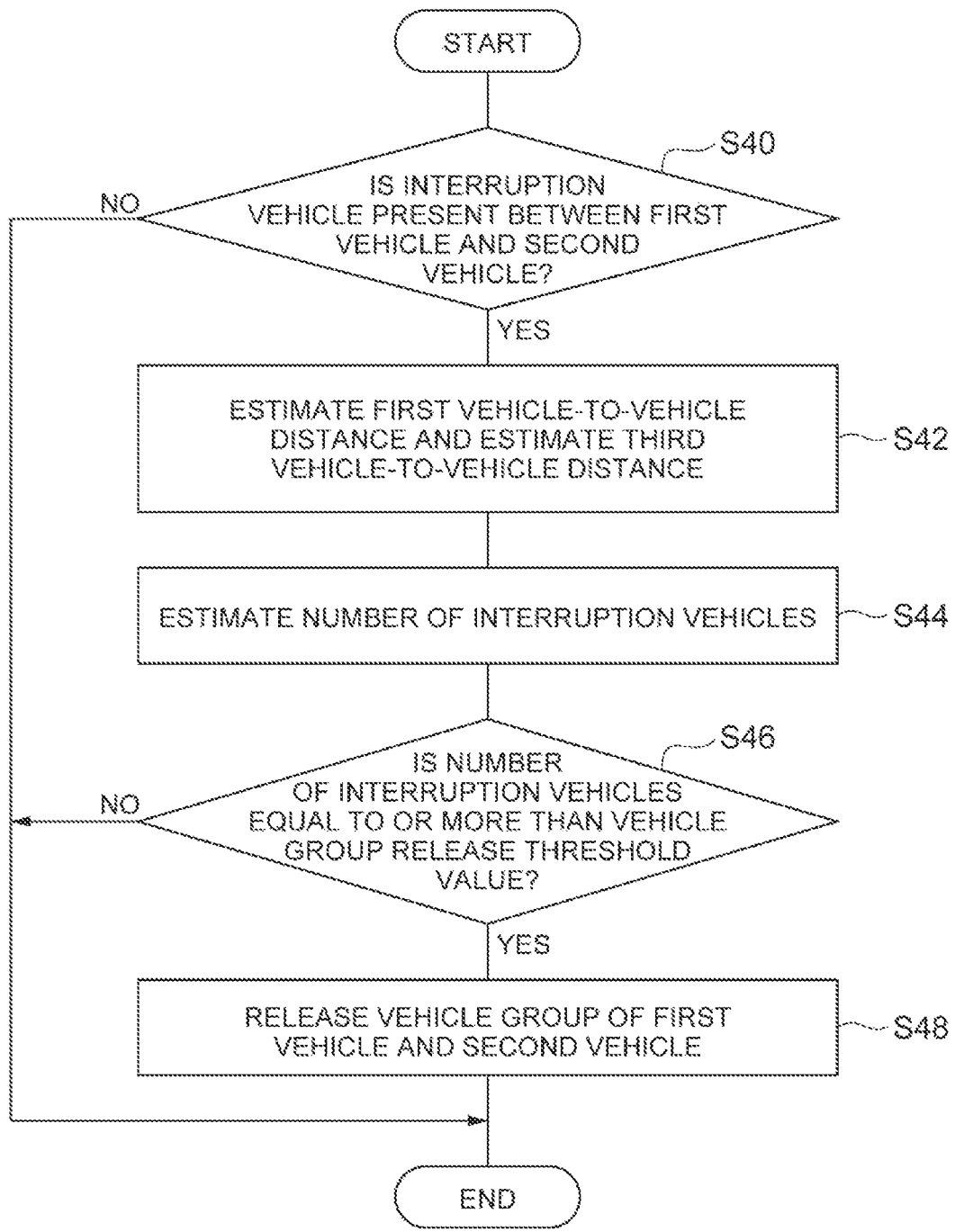
FIG. 9 is a flowchart illustrating vehicle group release processing in the second embodiment.

Vehicle Group Release Processing in Vehicle Group Control Device in Second Embodiment Next, vehicle group release processing by the vehicle group control device 20 in the second embodiment will be described with reference to FIG. 9. FIG. 9 is a flowchart illustrating the vehicle group release processing in the vehicle group control device 20 in the second embodiment. The processing in the flowchart illustrated in FIG. 9 is executed when the first vehicle 100 and the second vehicle 200 are traveling as one vehicle group.

As illustrated in FIG. 9, in the vehicle group control device 20, as S40, the interruption determination unit 11 determines whether or not an interruption vehicle not included in the vehicle group is present between the first vehicle 100 and the second vehicle 200. If it is determined that the interruption vehicle is not present (NO in S40), the vehicle group control device 20 ends the current processing.

Thereafter, the vehicle group control device 20 performs the determination in S40 again after a constant time elapses. If it is determined that the interruption vehicle is present (YES in S40), the vehicle group control device 20 makes the process proceed to S42.

In the vehicle group control device 20, as S42, the first vehicle-to-vehicle distance estimation unit 15 estimates the first vehicle-to-vehicle distance Dc and the third vehicle-to-vehicle distance recognition unit 21 estimates the third vehicle-to-vehicle distance Dt. As an example, the third vehicle-to-vehicle distance recognition unit 21 estimates the third vehicle-to-vehicle distance Dt based on the result of measurement performed by the vehicle-mounted sensor 202 (the result of measurement performed by the external sensor) of the second vehicle 200.

In the vehicle group control device 20, as S44, the number of interruption vehicles estimation unit 22 estimates the number of interruption vehicles. The number of interruption vehicles estimation unit 22 estimates the number of interruption vehicles based on the first vehicle-to-vehicle distance Dc estimated by the first vehicle-to-vehicle distance estimation unit 15 and the third vehicle-to-vehicle distance Dt recognized by the third vehicle-to-vehicle distance recognition unit 21.

In the vehicle group control device 20, as S46, the vehicle group release unit 18 determines whether or not the number of interruption vehicles is equal to or greater than the vehicle group release threshold value. If it is determined that the number of interruption vehicles is not equal to or greater than the vehicle group release threshold value (NO in S46), the vehicle group control device 20 ends the current processing. Thereafter, the vehicle group control device 20 performs the determination in S40 again after a constant time elapses. If it is determined that the number of interruption vehicles is equal to or greater than the vehicle group release threshold value (YES in S46), the vehicle group control device 20 makes the process proceed to S48.

In the vehicle group control device 20, as S48, the vehicle group release unit 18 releases the vehicle group of the first vehicle 100 and the second vehicle 200. Vehicle group release threshold value changing processing and first vehicle-to-vehicle distance estimation method by the vehicle group control device 20 are same in the first embodiment.

In the vehicle group control device 20 in the second embodiment described above, the effects same as that in the first embodiment can be obtained. That is, in the vehicle group control device 20, if an interruption vehicle not included in the vehicle group is present between the first vehicle 100 and the second vehicle 200, it is possible to estimate the number of interruption vehicles between the first vehicle 100 and the second vehicle 200 based on the first vehicle-to-vehicle distance Dc and the third vehicle-to-vehicle distance Dt by estimating the first vehicle-to-vehicle distance Dc, which is the vehicle-to-vehicle distance between the first vehicle 100 and the second vehicle 200, and by recognizing the third vehicle-to-vehicle distance Dt which is the vehicle-to-vehicle distance between the second vehicle 200 and the leading interruption vehicle Nb based on the result of measurement performed by the vehicle-mounted sensor 202 of the second vehicle 200. Furthermore, in the vehicle group control device 10, even if a plurality of interruption vehicles not included in the vehicle group, if the reference vehicle speed of reference interruption vehicle Na is equal to or lower than the set maximum speed and if the difference between the reference vehicle speed and the set maximum speed is equal to or smaller than the difference threshold value, since the vehicle speed (target vehicle speed) of the first vehicle 100 and the second vehicle 200 forming the vehicle group is close to the set maximum speed in the lane, and thus, it is considered that it is unlikely that the situation of delaying the traveling of the interruption vehicle other than the reference interruption vehicle Na occurs due to the vehicle group control. And according to the vehicle group control device 20, if it is unlikely that the situation of delaying the traveling of the interruption vehicle occurs, it is possible to continue the vehicle group control by changing the vehicle group release threshold value to a larger value even if a plurality of interruption vehicles not included in a vehicle group are present.

The preferred embodiments of the present disclosure have been described above, however, the present disclosure is not limited to the embodiments described above. The present disclosure can be embodied in various forms including various modifications and improvements based on the knowledge of those skilled in the art, including the embodiments described above.

The vehicle group control devices 10 and 20 do not need be configured in the server, but may be mounted on the first vehicle 100 or the second vehicle 200 or other vehicles. The vehicle group control devices 10 and 20 may be configured to be able to communicate with the first vehicle 100 and the second vehicle 200. In this case, the map database 8 may also be mounted on the vehicle, or the map database 8 may be configured in a server that can communicate with the vehicle group control device 10 and 20.

The first vehicle-to-vehicle distance estimation unit 15 may estimate the first vehicle-to-vehicle distance Dc between the first vehicle 100 and the second vehicle 200 from the very beginning using the GPS. In addition, the first vehicle-to-vehicle distance estimation unit 15 may perform only the estimation of the first vehicle-to-vehicle distance Dc by calculating the travel distances $L_1$ and $L_2$ using the integration of the vehicle speeds without using the GPS.

The number of interruption vehicles estimation unit 17 may change the value of the reference interruption vehicle length K. If the vehicle type of the reference interruption vehicle Na is recognized based on the result of measurement performed by the vehicle-mounted sensor 102 of the first vehicle 100, the number of interruption vehicles estimation unit 17 can change the value of the reference interruption vehicle length K according to the vehicle type. In recognizing the vehicle type, a well-known method such as pattern matching can be used. When the vehicle type of reference interruption vehicle Na is a truck or bus, the number of interruption vehicles estimation unit 17 sets the reference interruption vehicle length K as a larger value compared to a case where the vehicle type of the reference interruption vehicle Na is a passenger car. In this way, the number of interruption vehicles estimation unit 17 can improve the estimation accuracy of the number of interruption vehicles while considering the vehicle type of the actual reference interruption vehicle Na compared to the case where the reference interruption vehicle length K is a constant value. The length Kp of the leading interruption vehicle Nb in the second embodiment can also be changed similarly to the case of reference interruption vehicle length K.

The vehicle group control device 10 in the first embodiment may include the third vehicle-to-vehicle distance recognition unit 21 second embodiment. In this case, the number of interruption vehicles estimation unit 17 of the vehicle group control device 10 can estimate the number of interruption vehicles based on the first vehicle-to-vehicle distance Dc between the first vehicle 100 and the second vehicle 200, the second vehicle-to-vehicle distance Ds between the first vehicle 100 and the reference interruption vehicle Na, and the third vehicle-to-vehicle distance Dt between the second vehicle 200 and the leading interruption vehicle Nb (see FIG. 8).

Specifically, the number of interruption vehicles estimation unit 17 may determine whether the number of interruption vehicles is one or not using Equation (4) below. $Lt_3$ is a third determination threshold value set in advance.

$$Lt_3 \geq (Dc-K)/2-Ds-Dt| \quad (4)$$

If Equation (4) described above is not satisfied, the number of interruption vehicles estimation unit 17 determines whether the number of interruption vehicles is 2 or 3, using Equation (5) below. $Lt_4$ is a fourth determination threshold value set in advance. $Lt_4$ is set to a value larger than the third determination threshold value $Lt_3$ in order to prevent the determination chattering.

$$Lt_4 \leq |(Dc-K)/2-Ds| \quad (5)$$

If Equation (5) described above is satisfied, the number of interruption vehicles estimation unit 17 determines that the number of interruption vehicles is 2. If Equation (5) described above is not satisfied, the number of interruption vehicles estimation unit 17 determines that the number of interruption vehicles is equal to or greater than 3. Similarly, the number of interruption vehicles estimation unit 17 can also estimate the number of interruption vehicles of four or more.

What is claimed is:

1. A vehicle group control device configured to control traveling of a vehicle group including at least a first vehicle and a second vehicle traveling in front of the first vehicle, the device comprising:
    a first vehicle-to-vehicle distance estimation unit configured to estimate a first vehicle-to-vehicle distance which is a vehicle-to-vehicle distance between the first vehicle and the second vehicle;
    a second vehicle-to-vehicle distance recognition unit configured to recognize a second vehicle-to-vehicle distance which is a vehicle-to-vehicle distance between a reference interruption vehicle and the first vehicle, the reference interruption vehicle being from among the interruption vehicles and traveling immediately in front of the first vehicle, based on a result of measurement performed by a vehicle-mounted sensor of the first vehicle, when at least one interruption vehicle not included in the vehicle group is present between the first vehicle and the second vehicle;
    an interruption vehicle estimation unit configured to estimate the number of interruption vehicles between the first vehicle and the second vehicle based on the first vehicle-to-vehicle distance and the second vehicle-to-vehicle distance; and
    a set maximum speed information acquisition unit configured to acquire set maximum speed information relating to a set maximum speed set in advance for a lane in which the first vehicle and the second vehicle are traveling;
    wherein, if a reference vehicle speed is equal to or lower than the set maximum speed, when a difference between the reference vehicle speed and the set maximum speed is equal to or smaller than a difference threshold value, the vehicle group release threshold value is changed to a larger value compared to a case where the difference between the reference vehicle speed and the set maximum speed exceeds the difference threshold value.

2. The vehicle group control device according to claim 1, further comprising:
    a vehicle group release unit configured to release the vehicle group of the first vehicle and the second vehicle if the number of interruption vehicles estimated by the interruption vehicle estimation unit is equal to or greater than a vehicle group release threshold value which is greater than 1.

3. The vehicle group control device according to claim 2, further comprising:
    a reference vehicle speed recognition unit configured to recognize the reference vehicle speed which is a vehicle speed of the reference interruption vehicle based on the result of measurement performed by the vehicle-mounted sensor of the first vehicle, if at least one interruption vehicle not included in the vehicle group is present between the first vehicle and the second vehicle;
    and
    a vehicle group control unit configured to control the vehicle speed of the vehicle group based on the reference vehicle speed if the reference vehicle speed is equal to or lower than the set maximum speed.

4. A vehicle group control device configured to control traveling of a vehicle group including at least a first vehicle and a second vehicle traveling in front of the first vehicle, the device comprising:
    a first vehicle-to-vehicle distance estimation unit configured to estimate a first vehicle-to-vehicle distance which is a vehicle-to-vehicle distance between the first vehicle and the second vehicle;
    a third vehicle-to-vehicle distance recognition unit configured to recognize a third vehicle-to-vehicle distance which is a vehicle-to-vehicle distance between a leading interruption vehicle and the second vehicle, the leading interruption vehicle being from among the interruption vehicles and traveling immediately behind the second vehicle, based on a result of measurement performed by a vehicle-mounted sensor of the second vehicle, when at least one interruption vehicle not included in the vehicle group is present between the first vehicle and the second vehicle;
    an interruption vehicle estimation unit configured to estimate the number of interruption vehicles between the first vehicle and the second vehicle based on the first vehicle-to-vehicle distance and the third vehicle-to-vehicle distance; and
    a set maximum speed information acquisition unit configured to acquire set maximum speed information relating to a set maximum speed set in advance for a lane in which the first vehicle and the second vehicle are traveling;
    wherein, if a reference vehicle speed is equal to or lower than the set maximum speed, when a difference between the reference vehicle speed and the set maximum speed is equal to or smaller than a difference threshold value, the vehicle group release threshold value is changed to a larger value compared to a case where the difference between the reference vehicle speed and the set maximum speed exceeds the difference threshold value.

5. The vehicle group control device according to claim 4, further comprising:
    a vehicle group release unit configured to release the vehicle group of the first vehicle and the second vehicle when the number of interruption vehicles estimated by the interruption vehicle estimation unit is equal to or greater than a vehicle group release threshold value which is greater than 1.

6. The vehicle group control device according to claim 5, further comprising:
a reference vehicle speed recognition unit configured to recognize the reference vehicle speed which is a vehicle speed of a reference interruption vehicle traveling immediately in front of the first vehicle from among the interruption vehicles based on the result of measurement performed by the vehicle-mounted sensor of the first vehicle, if at least one interruption vehicle not included in the vehicle group is present between the first vehicle and the second vehicle; and
a vehicle group control unit configured to control the vehicle speed of the vehicle group based on the reference vehicle speed if the reference vehicle speed is equal to or lower than the set maximum speed.

* * * * *